(12) United States Patent
Zhang et al.

(10) Patent No.: US 12,027,914 B2
(45) Date of Patent: Jul. 2, 2024

(54) METHOD AND SYSTEM FOR OPERATION OF UPS MODULES CONNECTED IN PARALLEL

(71) Applicant: Vertiv Corporation, Columbus, OH (US)

(72) Inventors: Dong Zhang, Guangdong (CN); Chao Wang, Guangdong (CN); Longyun Zhang, Guangdong (CN)

(73) Assignee: Vertiv Corporation, Columbus, OH (US)

( * ) Notice: Subject to any disclaimer, the term of this patent is extended or adjusted under 35 U.S.C. 154(b) by 111 days.

(21) Appl. No.: 17/665,362

(22) Filed: Feb. 4, 2022

(65) Prior Publication Data

US 2023/0041719 A1  Feb. 9, 2023

(30) Foreign Application Priority Data

Aug. 3, 2021 (CN) .......................... 202110885198.6

(51) Int. Cl.
*H02J 9/06* (2006.01)
*H02J 9/00* (2006.01)

(52) U.S. Cl.
CPC .............. *H02J 9/068* (2020.01); *H02J 9/007* (2020.01)

(58) Field of Classification Search
CPC ... H02J 9/068; H02J 9/007; H02J 9/06; Y02E 40/30; Y02E 40/40
See application file for complete search history.

(56) References Cited

U.S. PATENT DOCUMENTS

2016/0020645 A1\* 1/2016 Tracy ...................... H02J 9/06
307/65
2016/0322862 A1\* 11/2016 Boratyn ................ G06F 1/3234

OTHER PUBLICATIONS

Extended Search Report dated Jan. 19, 2023, in corresponding European Application No. 22156226.7.
Giuntini Lorenzo et al.: "High-Efficiency UPS Protection for Industrial Applications", Proceedings of the International Exhibition and Conference for Power Electronics, Intelligent Motion, Renewable Energy and Energy Management (PCIM Europe 2017), Jul. 27, 2017 (Jul. 27, 2017), pp. 738-744, ISBN: 978-3-8007-4424-4.

(Continued)

*Primary Examiner* — Rexford N Barnie
*Assistant Examiner* — Thai H Tran
(74) *Attorney, Agent, or Firm* — Harness, Dickey & Pierce, P.L.C.

(57) ABSTRACT

A method for operation of UPS modules connected in parallel is provided. The method includes: in a case that a UPS system is constructed based on multiple UPS modules connected in parallel, sleeping, based on a system load rate, a predetermined number of UPS modules to control the UPS system to operate at a predetermined efficiency level; controlling UPS modules not being slept in the UPS system to enter into a main-inverter power supply mode or a main-bypass common mode to perform reactive power and harmonic compensation; and waking up the slept UPS modules when the system load rate drops by a predetermined value due to a sudden addition of a load. The UPS modules can be slept or waked up intelligently based on the system load rate in the dynamic online mode, ensuring that the UPS system operates around highest efficiency.

17 Claims, 4 Drawing Sheets

(56) References Cited

OTHER PUBLICATIONS

Lorenz Theresa: "USV Grundlagen—Thomas-Krenn-Wiki", Jul. 24, 2018 (Jul. 24, 2018) (including English translation).
Solter Wilhelm: "Klassifizierung von USV-Anlagen", Elektropraktiker, Dec. 31, 2003 ( Dec. 31, 2003), pp. 122-123 (including English translation).

* cited by examiner

METHOD AND SYSTEM FOR OPERATION OF UPS MODULES CONNECTED IN PARALLEL

This application claims the benefit and priority of Chinese Application No. 202110885198.6, filed on Aug. 3, 2021, the entire disclosure of which is incorporated herein by reference.

TECHNICAL FIELD

The present disclosure generally relates to the field of UPS, and in particular to a method and a system for operation of UPS modules connected in parallel.

BACKGROUND

Generally, a UPS system may include one or multiple racks. Each rack may include multiple UPS modules. During the operation of the UPS system, it is hoped to achieve highest operation efficiency of the system while ensuring high reliability. However, operation modes in the conventional technology have defects. For example, in an ECO energy-saving mode, although the operation efficiency of the UPS system is improved, the power factor of the bypass current cannot be guaranteed, and the power grid may be polluted due to an addition of a load. For another example, in a smart parallel sleep mode, although the operation efficiency of the system is improved, the reliability is reduced.

SUMMARY

According to the present disclosure, a method and a system for operation of UPS modules connected in parallel are provided to solve the technical problems in the conventional technology, improve the operation efficiency of the system and achieve high reliability.

To solve the above technical problems, a method for operation of UPS modules connected in parallel is provided according to the present disclosure. The method includes:
  step S1, in a case that a UPS system is constructed based on multiple UPS modules connected in parallel,
    sleeping, based on a system load rate, a predetermined number of UPS modules in the multiple UPS modules to control the UPS system to operate at a predetermined efficiency level; and
    controlling UPS modules not being slept in the multiple UPS modules of the UPS system to enter into a main-inverter power supply mode or a main-bypass common mode to perform reactive power and harmonic compensation; and
  step S2, waking up the slept UPS modules when the system load rate drops by a predetermined value due to a sudden addition of a load.

In the method for operation of UPS modules connected in parallel according to the present disclosure, the step S1 further includes:
  step S11, constructing the UPS system with the multiple UPS modules connected in parallel, and controlling the UPS modules to operate in the main-inverter power supply mode;
  step S12, determining whether it is required to sleep the UPS modules based on the system load rate; proceeding to step S13 in a case that it is required to sleep the UPS modules based on the system load rate; and controlling the UPS modules to operate in the main-inverter power supply mode in a case that it is not required to sleep the UPS modules based on the system load rate;
  step S13, sleeping a predetermined number of UPS modules to control the UPS system to operate at a first efficiency level or a second efficiency level;
  step S14, controlling UPS modules not being slept in the multiple UPS modules to enter into the main-bypass common mode to perform reactive power and harmonic compensation; and
  step S15, controlling, for each of the UPS modules not being slept, the UPS module to operate in a dynamic online mode or return to the main-inverter power supply mode based on a relationship between a bypass current and a bypass voltage.

In the method for operation of UPS modules connected in parallel according to the present disclosure, the step S13 further includes:
  step S131, sleeping a first predetermined number of UPS modules in a predetermined order and obtain a current efficiency level;
  step S132, calculating an estimated efficiency level after sleeping a second predetermined number of UPS modules in the predetermined order; and
  step S133, determining whether the current efficiency level is greater than the estimated efficiency level; proceeding to step S131 in a case that the current efficiency level is greater than the estimated efficiency level; and controlling the UPS system to operate at a current operation state in a case that the current efficiency level is not greater than the estimated efficiency level.

In the method for operation of UPS modules connected in parallel according to the present disclosure, the first predetermined number of UPS modules include one UPS module or all UPS modules included in a tower crane rack.

In the method for operation of UPS modules connected in parallel according to the present disclosure, in a case that a system load percentage is less than 20%, an efficiency level of the UPS system is an eighth efficiency level; in a case that a system load percentage is greater than or equal to 20% and less than 30%, an efficiency level of the UPS system is a seventh efficiency level; in a case that a system load percentage is greater than or equal to 30% and less than 40%, an efficiency level of the UPS system is a fourth efficiency level; in a case that a system load percentage is greater than or equal to 40% and less than 50%, an efficiency level of the UPS system is a first efficiency level; in a case that a system load percentage is greater than or equal to 50% and less than 60%, an efficiency level of the UPS system is a second efficiency level; in a case that a system load percentage is greater than or equal to 60% and less than 70%, an efficiency level of the UPS system is a third efficiency level; in a case that a system load percentage is greater than or equal to 70% and less than 80%, an efficiency level of the UPS system is a fifth efficiency level; in a case that a system load percentage is greater than or equal to 80% and less than 90%, an efficiency level of the UPS system is a sixth efficiency level; and in a case that a system load percentage is greater than or equal to 90%, an efficiency level of the UPS system is a ninth efficiency level.

In the method for operation of UPS modules connected in parallel according to the present disclosure, the step S14 further includes:
  step S14a, controlling UPS modules not being slept in the multiple UPS modules to enter into the main-bypass common mode and simultaneously performing bypass current sharing and harmonic compensation.

In the method for operation of UPS modules connected in parallel according to the present disclosure, the step S14 further includes:

step S141, controlling UPS modules not being slept to enter into the main-bypass common mode, controlling a main power unit of the UPS modules to invert to perform reactive power and harmonic compensation, controlling a bypass current to be sinusoidal, and controlling the bypass current to lead the bypass voltage for a first predetermined time period; and step S142, adjusting a bypass power tube drive of the UPS module based on a bypass power balance to share the bypass current of the UPS module for a second predetermined time period.

In the method for operation of UPS modules connected in parallel according to the present disclosure, the step S15 further includes: controlling, for each of the UPS modules not being slept, the UPS module to operate in the dynamic online mode or return to the main-inverter power supply mode in a case that the bypass current of the UPS module leads the bypass voltage by a predetermined angle and an input power factor is greater than a predetermined value.

In the method for operation of UPS modules connected in parallel according to the present disclosure, the step S2 further includes:

step S21, waking up the slept UPS modules when the system load rate drops by at least two efficiency levels due to the sudden addition of the load, controlling all the UPS modules to enter into the main-inverter power supply mode, and performing step S1 cyclically; or step S2a, waking up the slept UPS modules when the system load rate drops by at least two efficiency levels due to the sudden addition of the load, and controlling the waked UPS modules to directly enter into the dynamic online mode.

To solve the above technical problems, a system for operation of UPS modules connected in parallel is provided according to the present disclosure. The system includes multiple UPS modules and a processor. The processor stores a computer program. The computer program, when executed by the processor, causes the processor to perform the method for operation of UPS modules connected in parallel.

To solve the above technical problems, a system for operation of UPS modules connected in parallel is provided according to the present disclosure. The system includes multiple UPS modules. The system further includes a sleeping module and a waking module. The sleeping module is configured to, in a case that a UPS system is constructed based on multiple UPS modules connected in parallel, sleep a predetermined number of UPS modules in the multiple UPS modules based on a system load rate to control the UPS system to operate at a predetermined efficiency level, and control UPS modules not being slept in the multiple UPS modules of the UPS system to enter into a main-inverter power supply mode or a main-bypass common mode to perform reactive power and harmonic compensation. The waking module is configured to wake up the slept UPS modules when the system load rate drops by a predetermined value due to a sudden addition of a load.

In the system for operation of UPS modules connected in parallel according to the present disclosure, the sleeping module further includes a first mode control unit, a sleeping unit, a second mode control unit, and a third mode control unit. The first mode control unit is configured to construct the UPS system with the multiple UPS modules connected in parallel, and control the UPS modules to operate in the main-inverter power supply mode. The sleeping unit is configured to determine whether it is required to sleep the UPS modules based on the system load rate; sleep a predetermined number of UPS modules to control the UPS system to operate at a first efficiency level or a second efficiency level in a case that it is required to sleep the UPS modules based on the system load rate; and control the UPS modules to operate in the main-inverter power supply mode in a case that it is not required to sleep the UPS modules based on the system load rate. The second mode control unit is configured to control UPS modules not being slept in the multiple UPS modules to enter into the main-bypass common mode to perform reactive power and harmonic compensation. The third mode control unit is configured to control, for each of the UPS modules not being slept, the UPS module to operate in a dynamic online mode or return to the main-inverter power supply mode based on a relationship between a bypass current and a bypass voltage.

In the system for operation of UPS modules connected in parallel according to the present disclosure, the sleeping unit is further configured to: sleep a first predetermined number of UPS modules in a predetermined order and obtain a current efficiency level; calculate an estimated efficiency level after sleeping a second predetermined number of UPS modules in the predetermined order; determine whether the current efficiency level is greater than the estimated efficiency level; repeat the preceding three steps in a case that the current efficiency level is greater than the estimated efficiency level; and control the UPS system to operate at a current operation state in a case that the current efficiency level is not greater than the estimated efficiency level.

In the system for operation of UPS modules connected in parallel according to the present disclosure, the first predetermined number of UPS modules include one UPS module or all UPS modules included in a tower crane rack.

In the system for operation of UPS modules connected in parallel according to the present disclosure, in a case that a system load percentage is less than 20%, an efficiency level of the UPS system is an eighth efficiency level; in a case that a system load percentage is greater than or equal to 20% and less than 30%, an efficiency level of the UPS system is a seventh efficiency level; in a case that a system load percentage is greater than or equal to 30% and less than 40%, an efficiency level of the UPS system is a fourth efficiency level; in a case that a system load percentage is greater than or equal to 40% and less than 50%, an efficiency level of the UPS system is a first efficiency level; in a case that a system load percentage is greater than or equal to 50% and less than 60%, an efficiency level of the UPS system is a second efficiency level; in a case that a system load percentage is greater than or equal to 60% and less than 70%, an efficiency level of the UPS system is a third efficiency level; in a case that a system load percentage is greater than or equal to 70% and less than 80%, an efficiency level of the UPS system is a fifth efficiency level; in a case that a system load percentage is greater than or equal to 80% and less than 90%, an efficiency level of the UPS system is a sixth efficiency level; and in a case that a system load percentage is greater than or equal to 90%, an efficiency level of the UPS system is a ninth efficiency level.

In the system for operation of UPS modules connected in parallel according to the present disclosure, the second mode control unit further includes a first compensation sub-unit configured to control UPS modules not being slept in the multiple UPS modules to enter into the main-bypass common mode and simultaneously perform bypass current sharing and harmonic compensation.

In the system for operation of UPS modules connected in parallel according to the present disclosure, the second mode control unit further includes a second compensation sub-unit and a current sharing sub-unit. The second compensation sub-unit is configured to control UPS modules not being slept to enter into the main-bypass common mode, control a main power unit of the UPS modules to invert to perform reactive power and harmonic compensation, control a bypass current to be sinusoidal, and control the bypass current to lead the bypass voltage for a first predetermined time period. The current sharing sub-unit is configured to adjust a bypass power tube drive of the UPS module based on a bypass power balance to share the bypass current of the UPS module for a second predetermined time period.

In the system for operation of UPS modules connected in parallel according to the present disclosure, the third mode control unit is further configured to control, for each of the UPS modules not being slept, the UPS module to operate in the dynamic online mode or return to the main-inverter power supply mode in a case that the bypass current of the UPS module leads the bypass voltage by a predetermined angle and an input power factor is greater than a predetermined value.

In the system for operation of UPS modules connected in parallel according to the present disclosure, the waking module further includes a first waking unit or a second waking unit. The first waking unit is configured to wake up the slept UPS modules when the system load rate drops by at least two efficiency levels due to the sudden addition of the load, control all the UPS modules to enter into the main-inverter power supply mode, and trigger the sleeping module to operate cyclically. The second waking unit is configured to wake up the slept UPS modules when the system load rate drops by at least two efficiency levels due to the sudden addition of the load and control the waked UPS modules to directly enter into the dynamic online mode.

With the method and system for operation of UPS modules connected in parallel according to the present disclosure, the UPS modules can be slept or waked up intelligently based on the system load rate, improving the operation efficiency of the system, achieving high reliability, and thereby ensuring that the UPS system operates around highest efficiency. Further, reactive power and harmonic compensation can be performed on the bypass current to improve the input power factor and reduce the harmonic pollution to the power grid, and the UPS system can quickly switch from the main-bypass common mode to the main-inverter power supply mode when the input voltage is abnormal or a short circuit occurs, ensuring that the output voltage meets a class 1 curve. Furthermore, the transient state of the UPS module switching from the main-inverter power supply mode to the main-bypass common mode is performed in two stages, reducing the influence of mutual coupling between bypass current sharing and dynamic online compensation, and improving the power factor of the bypass input circuit.

BRIEF DESCRIPTION OF THE DRAWINGS

The present disclosure is further illustrated hereinafter in conjunction with the accompanying drawings and embodiments. In the drawings.

DETAILED DESCRIPTION OF THE EMBODIMENTS

In order to illustrate the objectives, technical solutions and advantages of the present disclosure more clearly, the present disclosure will be further described in detail below in conjunction with the drawings and embodiments. It should be understood that the embodiments described herein are only used to explain the present disclosure and not to limit the present disclosure.

A method for operation of UPS modules connected in parallel is provided according to the present disclosure. The method includes: in a case that a UPS system is constructed based on multiple UPS modules connected in parallel, sleeping a predetermined number of UPS modules in the multiple UPS modules based on a system load rate to control the UPS system to operate at a predetermined efficiency level; controlling UPS modules not being slept in the multiple UPS modules of the UPS system to enter into a main-inverter power supply mode or a main-bypass common mode to perform reactive power and harmonic compensation; and waking up the slept UPS modules when the system load rate drops by a predetermined value due to a sudden addition of a load. According to the present disclosure, the UPS modules can be slept or waked up intelligently based on the system load rate, improving the operation efficiency of the system, achieving high reliability, and thereby ensuring that the UPS system operates around highest efficiency.

Figure 1:
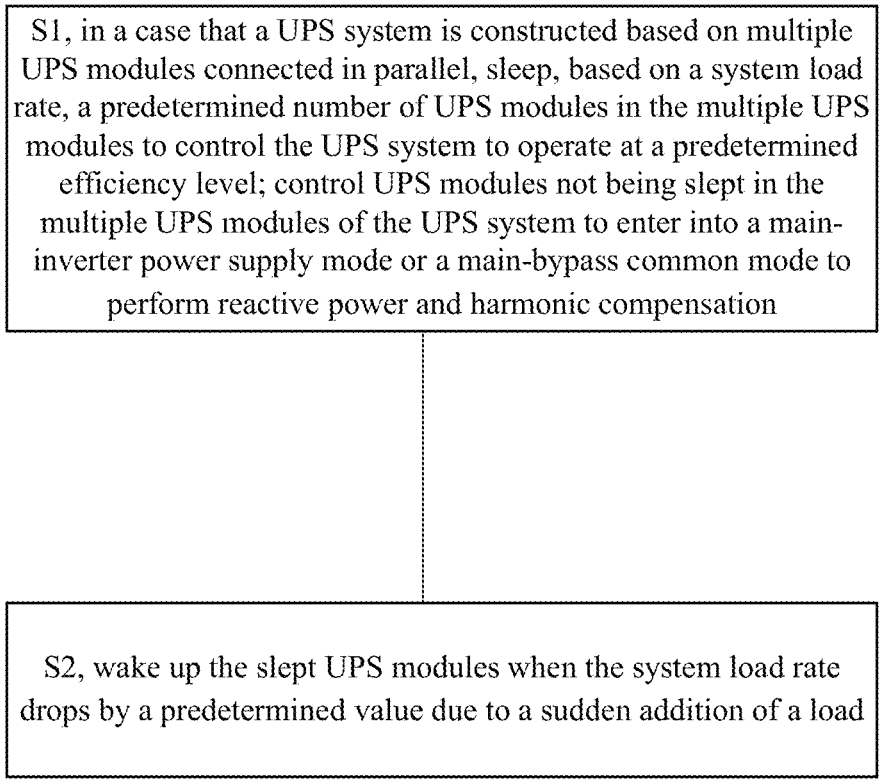
FIG. 1 is a flow chart of a method for operation of UPS modules connected in parallel according to a first preferred embodiment of the present disclosure.

FIG. 1 is a flow chart of a method for operation of UPS modules connected in parallel according to a first preferred embodiment of the present disclosure. As shown in FIG. 1, in step S1, in a case that a UPS system is constructed based on multiple UPS modules connected in parallel, a predetermined number of UPS modules in the multiple UPS modules are slept based on a system load rate to control the UPS system to operate at a predetermined efficiency level, and UPS modules not being slept in the multiple UPS modules of the UPS system are controlled to enter into a main-inverter power supply mode or a main-bypass common mode to perform reactive power and harmonic compensation.

In a case that a UPS system is constructed based on multiple racks connected in parallel or multiple UPS modules connected in parallel, a main-inverter power supply mode is entered into so as to supply power to a load. In this case, if the load is small, a predetermined number of the UPS modules may be slept based on a system load rate to control the UPS system to operate at a predetermined efficiency level.

In a preferred embodiment of the present disclosure, the UPS system may include multiple racks connected in parallel, each of the racks includes multiple UPS modules, and all the UPS modules in each of the racks are slept simultaneously. In another preferred embodiment of the present disclosure, the UPS system may include multiple UPS modules connected in parallel, and each of the UPS modules is slept independently.

In a preferred embodiment of the present disclosure, based on the range of the system load rate, from 0% to 100%, the load may be divided into multiple levels, for example, nine levels. To control the UPS system to operate at a predetermined efficiency level, such as a first efficiency level or a second efficiency level, a predetermined number of the UPS modules may be slept. For example, UPS modules included in a rack or UPS modules included in several racks are slept, or a UPS module or several UPS modules are slept. In this way, the UPS system can be controlled to operate at highest system efficiency. The UPS modules not being slept in the UPS system are controlled to enter into a main-inverter power supply mode or a main-bypass common mode (that is, a VI mode), the bypass circuit outputs an active power, reactive power and harmonic compensation are performed, and batteries in the UPS modules are charged, so that the power factor of the bypass input current is close to 1.

In step S2, when the system load rate drops by a predetermined value due to a sudden addition of a load, the slept UPS modules are waked up. The slept UPS modules are waked up within a short period of time, such as 3 ms, and quickly enter into the inverter power supply, ensuring high reliability of power supply. Even if the input voltage is abnormal or a short circuit occurs, the slept UPS modules quickly switch from a current mode to the main-inverter power supply mode.

In a preferred embodiment of the present disclosure, when the load is suddenly increased, for example, when the system load rate drops by at least two efficiency levels due to the sudden addition of the load, the slept UPS modules are waked up and controlled to enter into a dynamic online mode. In the preferred embodiments of the present disclosure, the dynamic online mode is a mode in which the output voltage of the UPS system meets a type of curve, such as a line standard curve (Class 1).

Since a dynamic process of bypass current sharing and harmonic extraction compensation is performed in waking up the slept UPS modules to enter into the dynamic online mode, the UPS system may be not stable. Therefore, in a further preferred embodiment of the present disclosure, when the system load rate drops by at least two efficiency levels due to the sudden addition of the load, the slept UPS modules are waked up, all the UPS modules are controlled to enter into the main-inverter power supply mode, and step S1 is performed cyclically. In this way, each of the UPS modules switches from a current operation mode to the main-inverter power supply mode, and step S1 is performed cyclically, further improving the reliability of the UPS system.

According to the present disclosure, the UPS modules can be slept or waked up intelligently based on the system load rate, improving the operation efficiency of the system, achieving high reliability, and thereby ensuring that the UPS system operates around highest efficiency.

Figure 2:
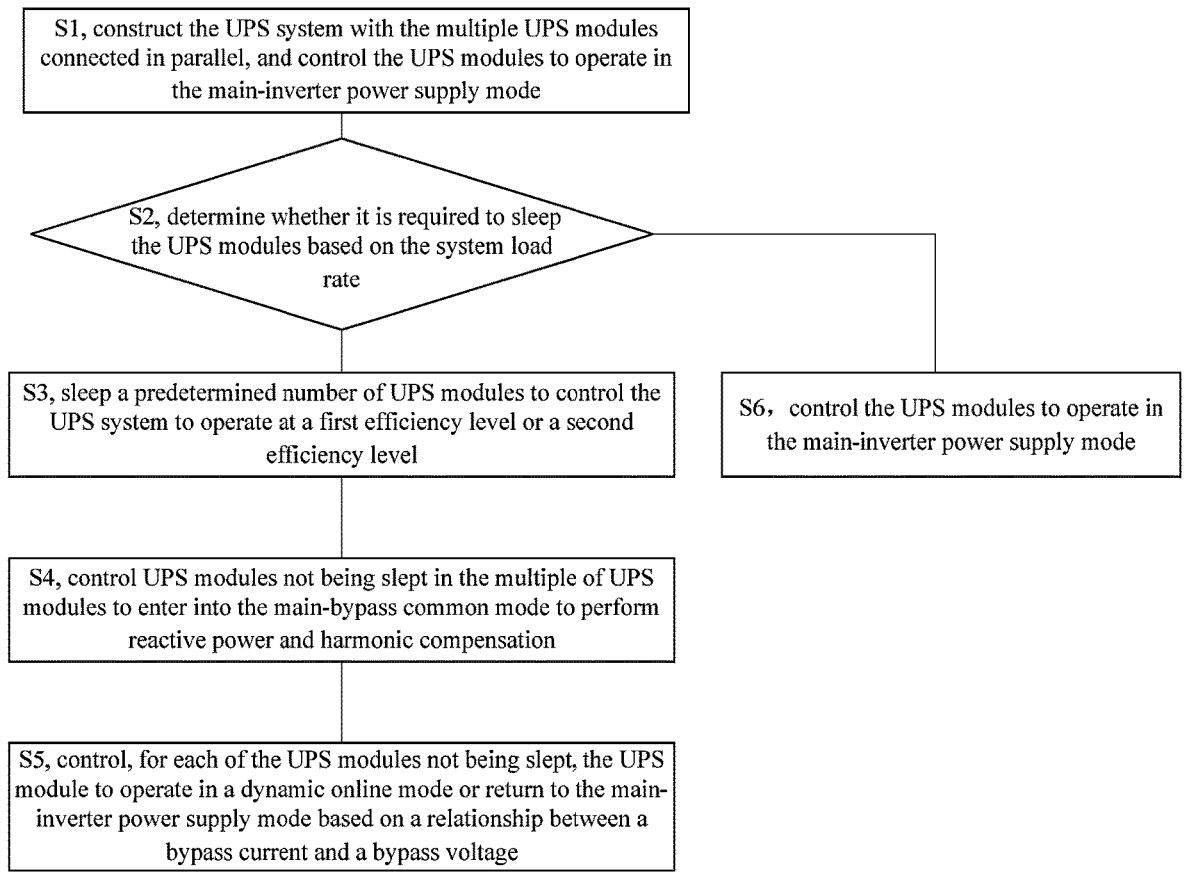
FIG. 2 is a flow chart of a method for operation of UPS modules connected in parallel according to a second preferred embodiment of the present disclosure.
Figure 3:
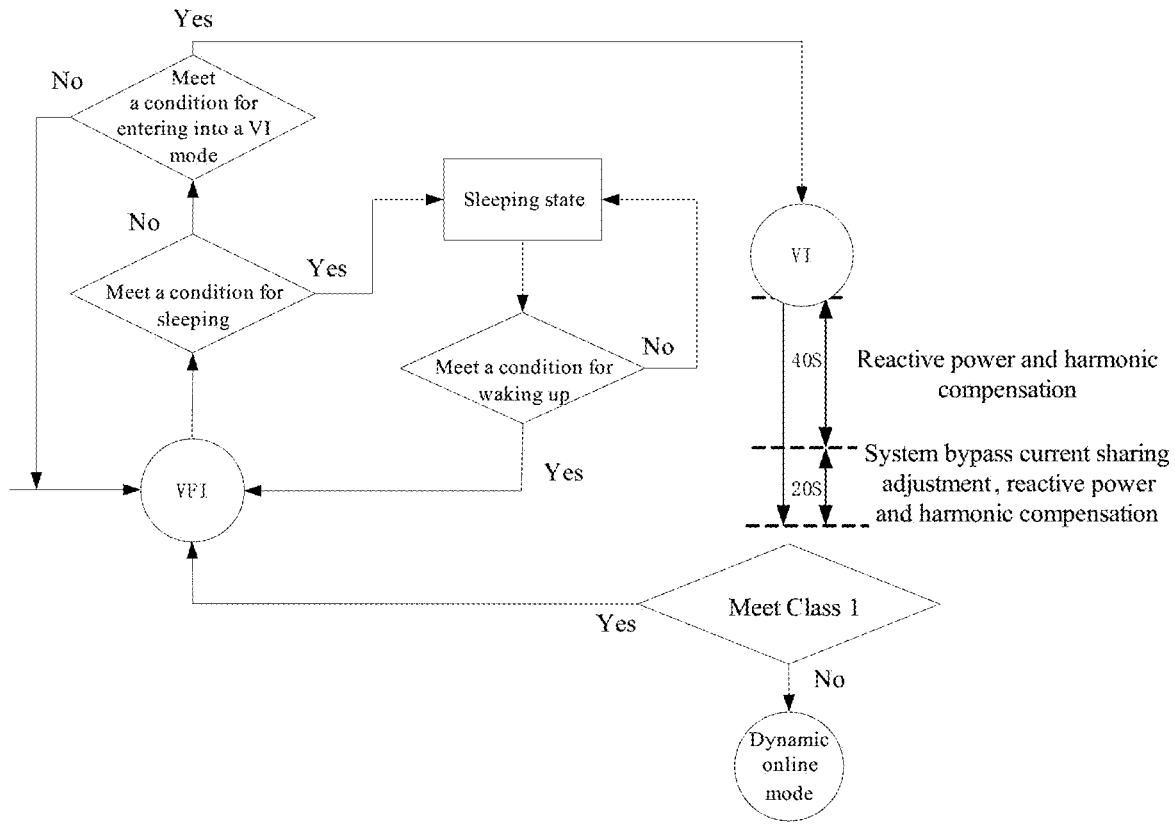
FIG. 3 is a schematic diagram showing a principle of the method for operation of UPS modules connected in parallel shown in FIG. 2.

FIG. 2 is a flow chart of a method for operation of UPS modules connected in parallel according to a second preferred embodiment of the present disclosure. FIG. 3 is a schematic diagram showing a principle of the method for operation of UPS modules connected in parallel shown in FIG. 2. As shown in FIGS. 2 and 3, in step S1, the UPS system is constructed with the multiple UPS modules connected in parallel, and the UPS modules are controlled to operate in the main-inverter power supply mode.

In a case that a UPS system is constructed based on multiple racks connected in parallel or multiple UPS modules connected in parallel, a main-inverter power supply mode is entered into so as to supply power to a load. In this case, if the load is small, a predetermined number of the UPS modules may be slept based on a system load rate to control the UPS system to operate at a predetermined efficiency level.

In a preferred embodiment of the present disclosure, the UPS system may include multiple racks connected in parallel, each of the racks includes multiple UPS modules, and all the UPS modules in each of the racks are slept simultaneously. In another preferred embodiment of the present disclosure, the UPS system may include multiple UPS modules connected in parallel, and each of the UPS modules is slept independently.

In step S2, it is determined whether it is required to sleep the UPS modules based on the system load rate. In a case that it is required to sleep the UPS modules based on the system load rate, proceed to step S3. In a case that it is not required to sleep the UPS modules based on the system load rate, proceed to step S6 to control the UPS modules to operate in the main-inverter power supply mode.

In a preferred embodiment of the present disclosure, based on the range of the system load rate, from 0% to 100%, the load may be divided into multiple levels, for example, nine levels. In a case that a system load percentage is less than 20%, an efficiency level of the UPS system is an eighth efficiency level; in a case that a system load percentage is greater than or equal to 20% and less than 30%, an efficiency level of the UPS system is a seventh efficiency level; in a case that a system load percentage is greater than or equal to 30% and less than 40%, an efficiency level of the UPS system is a fourth efficiency level; in a case that a system load percentage is greater than or equal to 40% and less than 50%, an efficiency level of the UPS system is a first efficiency level; in a case that a system load percentage is greater than or equal to 50% and less than 60%, an efficiency level of the UPS system is a second efficiency level; in a case that a system load percentage is greater than or equal to 60% and less than 70%, an efficiency level of the UPS system is a third efficiency level; in a case that a system load percentage is greater than or equal to 70% and less than 80%, an efficiency level of the UPS system is a fifth efficiency level; in a case that a system load percentage is greater than or equal to 80% and less than 90%, an efficiency level of the UPS system is a sixth efficiency level; and in a case that a system load percentage is greater than or equal to 90%, an efficiency level of the UPS system is a ninth efficiency level. A lower efficiency level indicates that an efficiency of the UPS system is a higher efficiency. Thus, in order to maintain the system to operate at a higher efficiency, it is required to control the UPS system to operate at a lower efficiency level. Therefore, for example, in a case it is determined based on the system load rate that the efficiency level of the UPS system is higher than the second efficiency level, that is, the third efficiency level or a higher efficiency level, the UPS modules are slept.

In step S3, a predetermined number of UPS modules are slept to control the UPS system to operate at the first efficiency level or the second efficiency level.

In a preferred embodiment of the present disclosure, in a case that the UPS system includes multiple racks connected in parallel, and each of the racks includes multiple UPS modules, all the UPS modules in each of the racks may be slept simultaneously, or one of the UPS modules may be slept. In another preferred embodiment of the present disclosure, in a case that the UPS system includes multiple UPS modules connected in parallel, one of the UPS modules may be slept independently at a time.

In a further preferred embodiment of the present disclosure, firstly, a first predetermined number of UPS modules are slept in a predetermined order and a current efficiency level is obtained. Then, an estimated efficiency level after sleeping a second predetermined number of UPS modules in the predetermined order is calculated. Finally, it is determined whether the current efficiency level is greater than the estimated efficiency level. In a case that the current efficiency level is greater than the estimated efficiency level, a first predetermined number of UPS modules are slept again and a current efficiency level is obtained, and the above steps are performed cyclically until a current efficiency level is equal to the estimated efficiency level. That is, the efficiency level is not to be reduced by sleeping the UPS modules.

In a further preferred embodiment of the present disclosure, the first predetermined number of UPS modules and the second predetermined number of UPS modules may be one UPS module, or may be all the UPS modules included in a rack. For the predetermined order, it indicates that the UPS modules are numbered first, and then the UPS modules are polled in a descending order or an ascending order of the numbers of the UPS modules.

For example, in a UPS system, five racks are included, and each of the racks includes five UPS modules. In a preferred embodiment of the present disclosure, the UPS modules may be numbered as shown in the following table:

| Number | Rack 1 | Rack 2 | Rack 3 | Rack 4 | Rack 5 |
|---|---|---|---|---|---|
| UPS module 1 | 1 | 6 | 11 | 16 | 21 |
| UPS module 2 | 2 | 6 | 12 | 17 | 22 |
| UPS module 3 | 3 | 8 | 13 | 18 | 23 |
| UPS module 4 | 4 | 8 | 14 | 19 | 24 |
| UPS module 5 | 5 | 10 | 15 | 20 | 25 |

In a case that it is determined based on the system load rate that it is required to sleep the UPS modules, the UPS module 1 is slept according to an ascending order of the numbers 1 to 25, and then a current efficiency level is calculated. Every time a UPS module is slept, the system load rate changes, and the current efficiency level corresponding to the system load rate changes. Then, an estimated efficiency level after UPS module 2 is slept is calculated. It is determined whether the current efficiency level is greater than the estimated efficiency level, that is, it is determined whether the efficiency level is decreased by sleeping the UPS modules. In a case that the efficiency level is decreased by sleeping the UPS modules, UPS module 2 is slept, then an estimated efficiency level after UPS module 3 is slept is calculated, and then the current efficiency level is compared with the estimated efficiency level, and so on, until the estimated efficiency level is not to be decreased by sleeping the UPS modules. Thus, the system is controlled to operate at a highest efficiency, that is, an efficiency level of the UPS system is the first efficiency level or the second efficiency level.

In other preferred embodiments of the present disclosure, all the UPS modules in each of the racks may be slept at a time. The principle and method are the same as the above embodiments, and are not repeated herein.

In step S4, UPS modules not being slept in the multiple of UPS modules are controlled to enter into the main-bypass common mode to perform reactive power and harmonic compensation. In a preferred embodiment of the present disclosure, the UPS modules not being slept in the multiple UPS modules are controlled to enter into the main-bypass common mode (that is, a VI mode), and reactive power and harmonic compensation are performed simultaneously.

For the UPS system constructed with multiple racks connected in parallel, current sharing and compensation are performed simultaneously after the VI mode is entered. Due to that the bypass current distorts, the reactive power and harmonics of the bypass current extracted by the bypass DSP distorts with the adjustment of bypass current sharing, resulting in a poor effect of the inverter in compensating reactive power and harmonics. Therefore, in a further embodiment of the present disclosure, the transient state of the UPS modules not being slept switching from the main-inverter mode (VFI mode) to the main-bypass common mode (VI mode) is adjusted in two stages.

In stage 1, the UPS modules not being slept are controlled to enter into the main-bypass common mode (VI mode), a main power unit of each of the UPS modules not being slept is controlled to invert to perform reactive power and harmonic compensation, a bypass current is controlled to be sinusoidal, and the bypass current is controlled to lead the bypass voltage for a first predetermined time period. For example, the UPS modules that are not sleeping are controlled to enter into the main-bypass common mode, and reactive and harmonic compensation are performed in a first predetermined time (such as, 40 S), so that the bypass current is sinusoidal, and the phase of the bypass current is substantially the same as the phase of the bypass voltage. The phase of the bypass current is controlled to lead the phase of the bypass voltage by 5 to 10 degrees, that is, a capacitive load is added, so that the bypass current leads the voltage. In this way, when a short circuit occurs at the input terminal, zero-crossing shutdown is performed on a bypass SCR in advance, without affecting the output voltage of the UPS system. The output voltage meets the class1 curve, that is, the dynamic online mode is entered. Making the zero-crossing shutdown of the bypass SCR in advance can also prepare for the subsequent adjustment of bypass current sharing. It is known by those skilled in the art that the first predetermined time period and the leading angle may be adjusted according to actual requirements.

In stage 2, for each of the UPS modules not being slept, a bypass power tube drive of the UPS module is adjusted based on a bypass power balance to share the bypass current of the UPS module for a second predetermined time period. For example, in the second predetermined period (such as, 20 s) after phase 1, for each of the UPS modules in each of the racks, the bypass power tube drive of the UPS module is adjusted based on the bypass power balance to share the bypass current of the UPS module, sharing the bypass current of each of the racks, achieving stable reactive power and harmonic compensation, thereby making the UPS system stable.

In a preferred embodiment of the present disclosure, the transient state of the UPS system switching from the VFI mode to the VI mode is divided into two stages for control, reducing the influence of mutual coupling between bypass current sharing and dynamic online compensation in connecting racks in parallel, and improving the power factor of the bypass input current.

In step S5, for each of the UPS modules not being slept, the UPS module is controlled to operate in the dynamic online mode or return to the main-inverter power supply mode based on a relationship between a bypass current and a bypass voltage. In a preferred embodiment of the present disclosure, for each of the UPS modules not being slept, the UPS module is controlled to operate in the dynamic online mode or return to the main-inverter power supply mode in a case that the bypass current of the UPS module leads the bypass voltage by a predetermined angle and an input power factor is greater than a predetermined value. For example, for each of the racks or for each of the UPS modules, the relationship between the bypass current and the bypass voltage is determined, and it is determined whether the dynamic online mode is exited. In a case of meeting a condition, the UPS module is controlled to operate in the dynamic online mode and run efficiently. In a case of not meeting a condition, the UPS module is controlled to switch from the dynamic online mode to the main-inverter power supply mode, and it is determined whether to enter into the dynamic online mode after the condition is met. For example, in a preferred embodiment of the present disclosure, after the steady state of bypass current sharing, reactive power and harmonic compensation, the dynamic online mode is maintained in a condition that the bypass current leads the bypass voltage by more than about 5 degrees and the input power is greater than 0.975, and the dynamic online mode is exited in other conditions. The dynamic online mode is a mode in which the output voltage meets the class1 curve.

In step S6, the slept UPS modules are waked up when the system load rate drops by a predetermined value due to a sudden addition of the load. In a preferred embodiment of the present disclosure, the slept UPS modules are waked up when the load is suddenly increased, for example, when the system load rate drops by at least two efficiency levels due to the sudden addition of the load, and the waked UPS modules are controlled to directly enter into the dynamic online mode. In the preferred embodiments of the present disclosure, the dynamic online mode is a mode in which the output voltage of the UPS system meets a type of curve, such as a line standard curve (Class 1).

Since a dynamic process of bypass current sharing and harmonic extraction compensation is performed in waking up the slept UPS modules to directly enter into the dynamic online mode, the UPS system may be not stable. Therefore, in a further preferred embodiment of the present disclosure, when the system load rate drops by at least two efficiency levels (for example, the efficiency level changes from 1 to 3) due to the sudden addition of the load, the slept UPS modules are waked up, all the UPS modules are controlled to enter into the main-inverter power supply mode, and steps S1 to S5 are performed cyclically. In this way, each of the UPS modules switches from a current operation mode to the main-inverter power supply mode, and steps S1 to S5 are performed cyclically, further improving the reliability of the UPS system.

With the method for operation of UPS modules connected in parallel according to the present disclosure, the UPS modules can be slept or waked up intelligently based on the system load rate, improving the operation efficiency of the system, achieving high reliability, and thereby ensuring that the UPS system operates around highest efficiency. Further, reactive power and harmonic compensation can be performed on the bypass current to improve the input power factor and reduce the harmonic pollution to the power grid. Furthermore, the transient state of the UPS module switching from the main-inverter power supply mode to the main-bypass common mode is performed in two stages, reducing the influence of mutual coupling between bypass current sharing and dynamic online compensation, and improving the power factor of the bypass input circuit.

According to a further preferred embodiment of the present disclosure, a system for operation of UPS modules connected in parallel is provided. The system includes multiple UPS modules and a processor. The processor stores a computer program. The computer program contains all the features for implementing the method according to the present disclosure. The computer program, when installed in the processor, causes the processor to perform the method according to the present disclosure. The computer program in the present disclosure is any expression, in any language, code or notation, of a set of instructions intended to cause a system having an information processing capability to perform a particular function either directly or after either or both of the following steps: a) converting to other languages, codes or symbols; b) reproducing in different formats.

Figure 4:
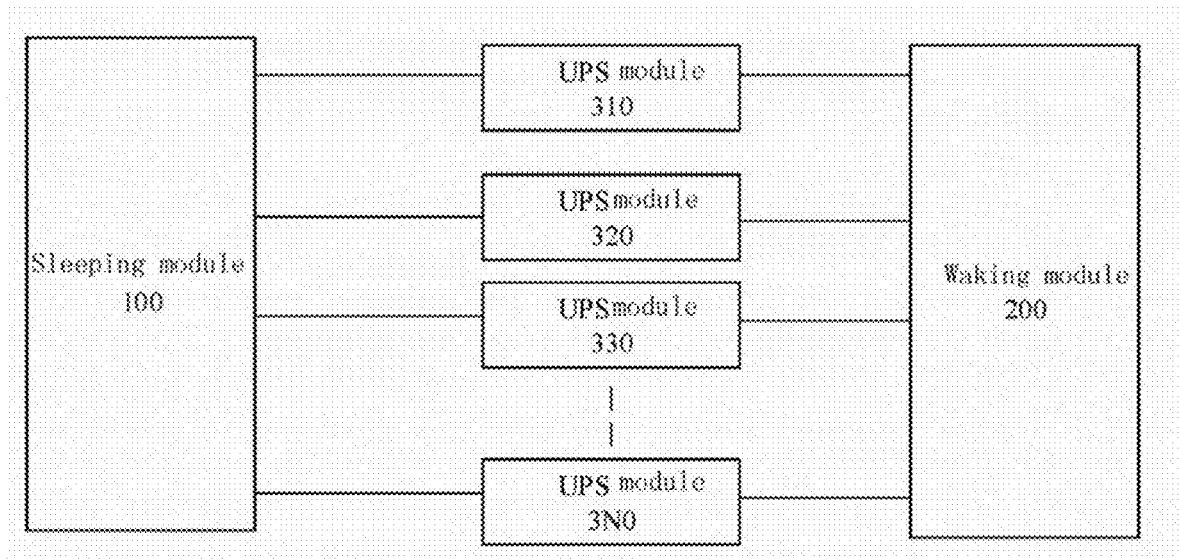
FIG. 4 is a schematic block diagram of a system for operation of UPS modules connected in parallel according to a first preferred embodiment of the present disclosure.

FIG. 4 is a schematic block diagram of a system for operation of UPS modules connected in parallel according to a first preferred embodiment of the present disclosure. As shown in FIG. 4, the system for operation of UPS modules connected in parallel according to the present disclosure includes multiple UPS modules 310, 320, 330, . . . , and 3N0, a sleeping module 100, and a waking module 200.

The multiple UPS modules 310, 320, 330, . . . , and 3N0 may be UPS modules in multiple racks connected in parallel, or may be different UPS modules. Therefore, as mentioned above, the UPS system may include multiple racks connected in parallel, each of the racks includes multiple UPS modules, and all the UPS modules in each of the racks are slept simultaneously. In another preferred embodiment of the present disclosure, the UPS system may include multiple UPS modules connected in parallel, and each of the UPS modules is slept independently.

The sleeping module 100 is configured to, in a case that a UPS system is constructed based on multiple UPS modules connected in parallel, sleep a predetermined number of UPS modules in the multiple UPS modules based on a system load rate to control the UPS system to operate at a predetermined efficiency level, and control the UPS modules not being slept in the multiple UPS modules of the UPS system to enter into a main-inverter power supply mode or a main-bypass common mode to perform reactive power and harmonic compensation. The waking module 200 is configured to wake up the slept UPS modules when the system load rate drops by a predetermined value due to a sudden addition of a load.

The sleeping module 100 and the waking module 200 may be implemented with reference to the embodiment shown in FIG. 1, which is not repeated herein.

Figure 5:
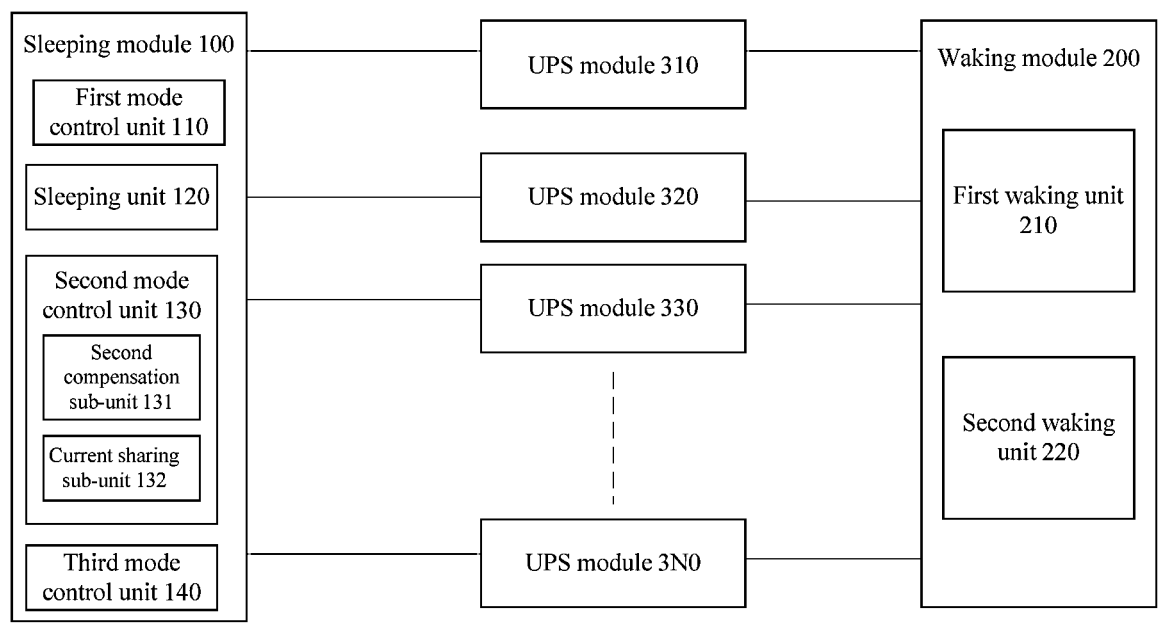
FIG. 5 is a schematic block diagram of a system for operation of UPS modules connected in parallel according to a second preferred embodiment of the present disclosure.

FIG. 5 is a schematic block diagram of a system for operation of UPS modules connected in parallel according to a second preferred embodiment of the present disclosure. As shown in FIG. 5, the system for operation of UPS modules connected in parallel according to the present disclosure includes multiple UPS modules 310, 320, 330, . . . , and 3N0, a sleeping module 100, and a waking module 200.

As shown in FIG. 5, the sleeping module 100 further includes a first mode control unit 110, a sleeping unit 120, a second mode control unit 130, and a third mode control unit 140.

The first mode control unit 110 is configured to construct the UPS system with the multiple UPS modules 310, 320, 330, . . . , and 3N0 connected in parallel, and control the UPS modules 310, 320, 330, . . . , and 3N0 to operate in the main-inverter power supply mode.

The sleeping unit 120 is configured to determine whether it is required to sleep the UPS modules 310, 320, 330, . . . , and 3N0 based on the system load rate, sleep a predetermined number of UPS modules to control the UPS system to operate at a first efficiency level or a second efficiency level in a case that it is required to sleep the UPS modules 310, 320, 330, . . . , and 3N0 based on the system load rate, and control the UPS modules to operate in the main-inverter power supply mode in a case that it is not required to sleep the UPS modules 310, 320, 330, . . . , and 3N0 based on the system load rate. The first predetermined number of UPS modules include one UPS module or all UPS modules included in a tower crane rack. In a case that a system load percentage is less than 20%, an efficiency level of the UPS system is an eighth efficiency level; in a case that a system load percentage is greater than or equal to 20% and less than 30%, an efficiency level of the UPS system is a seventh efficiency level; in a case that a system load percentage is greater than or equal to 30% and less than 40%, an efficiency level of the UPS system is a fourth efficiency level; in a case that a system load percentage is greater than or equal to 40% and less than 50%, an efficiency level of the UPS system is a first efficiency level; in a case that a system load percentage is greater than or equal to 50% and less than 60%, an efficiency level of the UPS system is a second efficiency level; in a case that a system load percentage is greater than or equal to 60% and less than 70%, an efficiency level of the UPS system is a third efficiency level; in a case that a system load percentage is greater than or equal to 70% and less than 80%, an efficiency level of the UPS system is a fifth efficiency level; in a case that a system load percentage is greater than or equal to 80% and less than 90%, an efficiency level of the UPS system is a sixth efficiency level; and in a case that a system load percentage is greater than or equal to 90%, an efficiency level of the UPS system is a ninth efficiency level. In a preferred embodiment of the present disclosure, the sleeping unit 120 is further configured to: sleep a first predetermined number of UPS modules in a predetermined order and obtain a current efficiency level; calculate an estimated efficiency level after sleeping a second predetermined number of UPS modules in the predetermined order; determine whether the current efficiency level is greater than the estimated efficiency level; repeat the above steps in a case that the current efficiency level is greater than the estimated efficiency level; and the current operation state is maintained in a case that the current efficiency level is not greater than the estimated efficiency level.

The second mode control unit 130 is configured to control UPS modules not being slept in the multiple UPS modules to enter into the main-bypass common mode to perform reactive power and harmonic compensation. In a preferred embodiment shown in FIG. 5, the second mode control unit 130 may include: a second compensation sub-unit 131 and a current sharing sub-unit 132. The second compensation sub-unit 131 is configured to control UPS modules not being slept to enter into the main-bypass common mode, control a main power unit of the UPS modules not being slept to invert to perform reactive power and harmonic compensation, control a bypass current to be sinusoidal, and control the bypass current to lead the bypass voltage for a first predetermined time period. The current sharing sub-unit 132 is configured to adjust, for each of the UPS modules not being slept, a bypass power tube drive of the UPS module based on a bypass power balance to share the bypass current of the UPS module for a second predetermined time period.

In another preferred embodiment of the present disclosure, the second mode control unit 130 may perform controlling in a different way, that is, perform bypass current sharing and harmonic compensation. The second mode control unit 130 may include a first compensation sub-unit configured to control UPS modules not being slept to enter into the main-bypass common mode and simultaneously perform bypass current sharing and harmonic compensation.

The third mode control unit 140 is configured to control, for each of the UPS modules not being slept, the UPS module to operate in a dynamic online mode or return to the main-inverter power supply mode based on a relationship between a bypass current and a bypass voltage. In a further preferred embodiment of the present disclosure, the third mode control unit 140 is further configured to control, for each of the UPS modules not being slept, the UPS module to operate in the dynamic online mode or return to the main-inverter power supply mode in a case that the bypass current of the UPS module leads the bypass voltage by a predetermined angle and an input power factor is greater than a predetermined value.

As shown in FIG. 5, the waking module 200 may include a first waking unit 210 or a second waking unit 220 to perform waking processing in different ways. The first waking unit 210 is configured to wake up the slept UPS modules when the system load rate drops by at least two efficiency levels due to the sudden addition of the load, control all the UPS modules to enter into the main-inverter power supply mode, and trigger the sleeping module 100 to operate cyclically.

The second waking unit 220 is configured to wake up the slept UPS modules when the system load rate drops by at least two efficiency levels due to the sudden addition of the load and control the waked UPS modules to directly enter into the dynamic online mode.

It is known by those skilled in the art that each of the first mode control unit 110, the sleeping unit 120, the second mode control unit 130, the third mode control unit 140, the first compensation sub-unit, the second compensation sub-unit 131, the current sharing sub-unit 132, the first waking unit 210 or the second waking unit 220 can be constructed with reference to the embodiments shown in FIGS. 2 to 4 and has the same principle as that described in the embodiments shown in FIGS. 2 to 4, which are not repeated herein.

With the system for operation of UPS modules connected in parallel according to the present disclosure, the UPS modules can be slept or waked up intelligently based on the system load rate, improving the operation efficiency of the system, achieving high reliability, and thereby ensuring that the UPS system operates around highest efficiency. Further, reactive power and harmonic compensation can be performed on the bypass current to improve the input power factor and reduce the harmonic pollution to the power grid. Furthermore, the transient state of the UPS module switching from the main-inverter power supply mode to the main-bypass common mode is performed in two stages, reducing the influence of mutual coupling between bypass current sharing and dynamic online compensation, and improving the power factor of the bypass input circuit. Therefore, the present disclosure may be implemented by hardware, software or a combination thereof. The present disclosure may be implemented in a centralized manner in at least one computer system, or in a distributed manner in different parts distributed in several interconnected computer systems. Any computer systems or other devices suitable for performing the method according to the present disclosure are applicable. A typical combination of hardware and software can be a general purpose computer system with a computer program that, when being loaded and executed, causes the computer system to perform the method according to the present disclosure.

Although the present disclosure has been disclosed above through the description of specific embodiments of the disclosure, it should be understood that those skilled in the art can design multiple modifications and equivalents to the disclosure without departing from the scope of the present disclosure. In addition, various modifications may be made to the present disclosure for specific situations or materials without departing from the scope of the present disclosure. Therefore, the present disclosure is not limited to the disclosed specific embodiments, and should include all embodiments falling within the scope of the claims of the present disclosure.

The foregoing embodiments are only preferred embodiments of the disclosure and are not meant to limit the disclosure. All modifications, equivalent variations and improvements made within the spirit and scope of the present disclosure should be considered to be included in the scope claimed by the present disclosure.

The invention claimed is:

1. A method for operation of UPS modules connected in parallel, comprising:
in a case that a UPS system is constructed based on a plurality of UPS modules connected in parallel,
sleeping, based on a system load rate, a predetermined number of UPS modules in the plurality of UPS modules to control the UPS system to operate at a predetermined efficiency level; and
controlling UPS modules not being slept in the plurality of UPS modules of the UPS system to enter into a main-inverter power supply mode or a main-bypass common mode to perform reactive power and harmonic compensation; and
waking up the slept UPS modules when the system load rate drops by a predetermined value due to a sudden addition of a load,
wherein the step of sleeping, based on the system load rate, a predetermined number of UPS modules in the plurality of UPS modules and controlling UPS modules not being slept in the plurality of UPS modules of the UPS system to enter into the main-inverter power supply mode or the main-bypass common mode further comprises:
constructing the UPS system with the plurality of UPS modules connected in parallel, and controlling the UPS modules to operate in the main-inverter power supply mode;
detemining whether it is required to sleep the UPS modules based on the system load rate; proceeding to a step of sleeping the predetermined number of UPS modules in a case that is required to sleep the UPS modules based on the system load rate; and controlling the UPS modules to operate in the main-inverter power supply mode in a case that it is not required to sleep the UPS modules based on the system load rate;
sleeping the predetermined number of UPS modules to control the UPS system to operate at a first efficiency level or a second efficiency level; and
controlling UPS modules not being slept in the plurality of UPS modules to enter into the main-bypass common mode to perform reactive power and harmonic compensation,
wherein the step of controlling UPS modules not being slept in the plurality of UPS modules to enter into the main-bypass common mode to perform reactive power and harmonic compensation further comprises:
controlling the UPS modules not being slept in the plurality of UPS modules to enter into the main-bypass common mode and simultaneously performing bypass current sharing and harmonic compensation.

2. The method for operation of UPS modules connected in parallel according to claim 1, wherein the step of sleeping, based on the system load rate, a predetermined number of UPS modules in the plurality of UPS modules and controlling UPS modules not being slept in the plurality of UPS modules of the UPS system to enter into the main-inverter power supply mode or the main-bypass common mode further comprises:
controlling, for each of the UPS modules not being slept, the UPS module to operate in a dynamic online mode or return to the main-inverter power supply mode based on a relationship between a bypass currents and a bypass voltage.

3. The method for operation of UPS modules connected in parallel according to claim 2, wherein the step of sleeping the predetermined number of UPS modules further comprises:
sleeping a first predetermined number of UPS modules in a predetermined order and obtain a current efficiency level;
calculating an estimated efficiency level after sleeping a second predetermined number of UPS modules in the predetermined order; and
determining whether the current efficiency level is greater than the estimated efficiency level; proceeding to the step of sleeping the first predetermined number of UPS modules in the predetermined order and obtain a current efficiency level in a case that the current efficiency level is greater than the estimated efficiency level; and controlling the UPS system to operate at a current operation state in a case that the current efficiency level is not greater than the estimated efficiency level.

4. The method for operation of UPS modules connected in parallel according to claim 3, wherein the first predetermined number of UPS modules comprise one UPS module or all UPS modules comprised in a tower crane rack.

5. The method for operation of UPS modules connected in parallel according to claim 3, wherein in a case that a system load percentage is less than 20%, an efficiency level of the UPS system is an eighth efficiency level; in a case that a system load percentage is greater than or equal to 20% and less than 30%, an efficiency level of the UPS system is a seventh efficiency level; in a case that a system load percentage is greater than or equal to 30% and less than 40%, an efficiency level of the UPS system is a fourth efficiency level; in a case that a system load percentage is greater than or equal to 40% and less than 50%, an efficiency level of the UPS system is a first efficiency level; in a case that a system load percentage is greater than or equal to 50% and less than 60%, an efficiency level of the UPS system is a second efficiency level; in a case that a system load percentage is greater than or equal to 60% and less than 70%, an efficiency level of the UPS system is a third efficiency level; in a case that a system load percentage is greater than or equal to 70% and less than 80%, an efficiency level of the UPS system is a fifth efficiency level; in a case that a system load percentage is greater than or equal to 80% and less than 90%, an efficiency level of the UPS system is a sixth efficiency level;

and in a case that a system load percentage is greater than or equal to 90%, an efficiency level of the UPS system is a ninth efficiency level.

6. The method for operation of UPS modules connected in parallel according to claim 3, wherein the step of controlling UPS modules not being slept in the plurality of UPS modules to enter into the main main-bypass common mode to perform reactive power and harmonic compensation further comprises:
controlling the UPS modules not being slept to enter into the main-bypass common mode, controlling a main power unit of the UPS modules to invert to perform reactive power and harmonic compensation, controlling a bypass current to be sinusoidal, and controlling the bypass current to lead the bypass voltage for a first predetermined time period; and
adjusting a bypass power tube drive of the UPS module based on a bypass power balance to share the bypass current of the UPS module for a second predetermined time period.

7. The method for operation of UPS modules connected in parallel according to claim 3, wherein the step of controlling, for each of the UPS modules not being slept, the UPS module to operate in the dynamic online mode or return to the main-inverter power supply mode based on the relationship between the bypass current and the bypass voltage further comprises:
controlling, for each of the UPS modules not being slept, the UPS module to operate in the dynamic online mode or return to the main-inverter power supply mode in a case that the bypass current of the UPS module leads the bypass voltage by a predetermined angle and an input power factor is greater than a predetermined value.

8. The method for operation of UPS modules connected in parallel according to claim 3, wherein the step of waking up the slept UPS modules further comprises:
waking up the slept UPS modules when the system load rate drops by at least two efficiency levels due to the sudden addition of the load, controlling all the UPS modules to enter into the main-inverter power supply mode, and performing the step of sleeping, based on the system load rate, a predetermined number of UPS modules in the plurality of UPS modules and controlling UPS modules not being slept in the plurality of UPS modules of the UPS system to enter into the main-inverter power supply mode or the main-bypass common mode; or
waking up the slept UPS modules when the system load rate drops by at least two efficiency levels due to the sudden addition of the load, and controlling the waked UPS modules to directly enter into the dynamic online mode.

9. A system for operation of UPS modules connected in parallel, comprising:
a plurality of UPS modules, and
a processor storing a computer program, wherein the computer program, when executed by the processor, causes the processor to perform the method for operation of UPS modules connected in parallel according to claim 1.

10. A system for operation of UPS modules connected in parallel comprising a plurality of UPS modules, wherein the system further comprises:
a sleeping module, configured to, in a case that a UPS system is constructed based on the plurality of UPS modules connected in parallel, sleep a predetermined number of UPS modules in the plurality of UPS modules based on a system load rate to control the UPS system to operate at a predetermined efficiency level, and control UPS modules not being slept in the plurality of UPS modules of the UPS system to enter into a main-inverter power supply mode or a main-bypass common mode to perform reactive power and harmonic compensation; and
a waking module, configured to wake up the slept UPS modules when the system load rate drops by a predetermined value due to a sudden addition of a load,
wherein the sleeping module further comprises:
a first mode control unit, configured to construct the UPS system with the plurality of UPS modules connected in parallel, and control the UPS modules to operate in the main-inverter power supply mode;
a sleeping unit, configured to determine whether it is rquired to sleep the UPS modules based on the system load rate, sleep a predetermined number of UPS modules to control the UPS system to operatie at a fist efficiency level or a second efficiency level in a case that it is required to sleep the UPS modules based on the system load rate, and control the UPS modules to operate in the main-invertere power supply mode in a case that it is not required to sleep the UPS modules based on the system load rate; and
a second mode control unit, configured to control UPS modules not being slept in the plurality of UPS modules to enter into the main-bypass common mode to perform reactive power and harmonic compensation,
wherein the second mode control unit further comprises a first compensation sub-unit configured to control UPS modules not being slept in the plurality of UPS modules to enter into the main-bypass common mode and simultaneously perform bypass current sharing and harmonic compensation.

11. The system for operation of UPS modules connected in parallel according to claim 10, wherein the sleeping module further comprises:
a third mode control unit, configured to control, for each of the UPS modules not being slept, the UPS module to operate in a dynamic online mode or return to the main-inverter power supply mode based on a relationship between a bypass current and a bypass voltage.

12. The system for operation of UPS modules connected in parallel according to claim 11, wherein the sleeping unit is further configured to: sleep a first predetermined number of UPS modules in a predetermined order and obtain a current efficiency level; calculate an estimated efficiency level after sleeping a second predetermined number of UPS modules in the predetermined order; determine whether the current efficiency level is greater than the estimated efficiency level; repeat the preceding three steps in a case that the current efficiency level is greater than the estimated efficiency level; and control the UPS system to operate at a current operation state in a case that the current efficiency level is not greater than the estimated efficiency level.

13. The system for operation of UPS modules connected in parallel according to claim 12, wherein the first predetermined number of UPS modules comprise one UPS module or all UPS modules comprised in a tower crane rack.

14. The system for operation of UPS modules connected in parallel according to claim 12, wherein in a case that a system load percentage is less than 20%, an efficiency level of the UPS system is an eighth efficiency level; in a case that a system load percentage is greater than or equal to 20% and less than 30%, an efficiency level of the UPS system is a seventh efficiency level; in a case that a system load percentage is greater than or equal to 30% and less than 40%, an efficiency level of the UPS system is a fourth efficiency level; in a case that a system load percentage is greater than or equal to 40% and less than 50%, an efficiency level of the UPS system is a first efficiency level; in a case that a system load percentage is greater than or equal to 50% and less than 60%, an efficiency level of the UPS system is a second efficiency level; in a case that a system load percentage is greater than or equal to 60% and less than 70%, an efficiency level of the UPS system is a third efficiency level; in a case that a system load percentage is greater than or equal to 70% and less than 80%, an efficiency level of the UPS system is a fifth efficiency level; in a case that a system load percentage is greater than or equal to 80% and less than 90%, an efficiency level of the UPS system is a sixth efficiency level; and in a case that a system load percentage is greater than or equal to 90%, an efficiency level of the UPS system is a ninth efficiency level.

15. The system for operation of UPS modules connected in parallel according to claim 12, wherein the second mode control unit further comprises:
a second compensation sub-unit, configured to control UPS modules not being slept to enter into the main-bypass common mode, control a main power unit of the UPS modules to invert to perform reactive power and harmonic compensation, control a bypass current to be sinusoidal, and control the bypass current to lead the bypass voltage for a first predetermined time period; and a current sharing sub-unit, configured to adjust a bypass power tube drive of the UPS module based on a bypass power balance to share the bypass current of the UPS module for a second predetermined time period.

16. The system for operation of UPS modules connected in parallel according to claim 12, wherein the third mode control unit is further configured to control, for each of the UPS modules not being slept, the UPS module to operate in the dynamic online mode or return to the main-inverter power supply mode in a case that the bypass current of the UPS module leads the bypass voltage by a predetermined angle and an input power factor is greater than a predetermined value.

17. The system for operation of UPS modules connected in parallel according to claim 12, wherein the waking module further comprises:
a first waking unit, configured to wake up the slept UPS modules when the system load rate drops by at least two efficiency levels due to the sudden addition of the load, control all the UPS modules to enter into the main-inverter power supply mode, and trigger the sleeping module to operate cyclically; or
a second waking unit, configured to wake up the slept UPS modules when the system load rate drops by at least two efficiency levels due to the sudden addition of the load and control the waked UPS modules to directly enter into the dynamic online mode.

* * * * *